(12) United States Patent
Sennoun

(10) Patent No.: US 10,697,371 B2
(45) Date of Patent: Jun. 30, 2020

(54) METHOD AND SYSTEM FOR A COMBINED AIR-OIL COOLER AND FUEL-OIL COOLER HEAT EXCHANGER

(71) Applicant: General Electric Company, Schenectady, NY (US)

(72) Inventor: Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 14/980,879

(22) Filed: Dec. 28, 2015

(65) Prior Publication Data

US 2017/0184028 A1   Jun. 29, 2017

(51) Int. Cl.
　　*F02C 7/14* (2006.01)
　　*F02C 7/18* (2006.01)
　　(Continued)

(52) U.S. Cl.
　　CPC .............. *F02C 7/14* (2013.01); *F01D 25/12* (2013.01); *F01D 25/24* (2013.01); *F01M 5/002* (2013.01);
　　(Continued)

(58) Field of Classification Search
　　CPC .. F02C 7/14; F02C 7/141; F02C 7/185; F02C 7/224; F02C 7/12; F02C 7/18; F28D 1/0408; F28D 1/0426; F28D 1/0443; F28D 1/0461; F28D 7/0008; F28D 7/0066; F01M 5/002; F01M 2005/004; F05D 2260/213; F05D 2260/22141; F05D 2260/221; F01D 25/12; F01D 25/24; F28F 27/02; F01P 11/08
See application file for complete search history.

(56) References Cited

U.S. PATENT DOCUMENTS 1,533,284 A  *  4/1925  Verville ................. B64D 33/10
　　　　　　　　　　　　　　　　　　　　　244/57
2,731,239 A  *  1/1956  Andersen ................. F01P 11/08
　　　　　　　　　　　　　　　　　　　　　123/196 AB
(Continued)

FOREIGN PATENT DOCUMENTS

FR　　　　3008449 A1　　1/2015
JP　　2001-082169 A　　3/2001
(Continued)

OTHER PUBLICATIONS

Extended European Search Report and Opinion issued in connection with corresponding EP Application No. 16203100.9 dated May 4, 2017.
(Continued)

*Primary Examiner* — Alain Chau
(74) *Attorney, Agent, or Firm* — General Electric; James Reed

(57) ABSTRACT

The heat exchanger assembly includes a first internal flow path configured to channel a flow of fluid to be cooled from a first inlet to a first outlet. The heat exchanger assembly also includes a second internal flow path configured to channel a flow of a first coolant from a first inlet to a first outlet. The heat exchanger assembly further includes an external flow path configured to receive a flow of a second coolant proximate a surface of the external flow path.

11 Claims, 4 Drawing Sheets

(51) Int. Cl.

| | | |
|---|---|---|
| *F02C 7/12* | (2006.01) | |
| *F01M 5/00* | (2006.01) | |
| *F28D 1/04* | (2006.01) | |
| *F01D 25/12* | (2006.01) | |
| *F01D 25/24* | (2006.01) | |
| *F02C 3/04* | (2006.01) | |
| *F02C 7/224* | (2006.01) | |
| *F02K 3/06* | (2006.01) | |

(52) U.S. Cl.
CPC .............. *F02C 3/04* (2013.01); *F02C 7/12* (2013.01); *F02C 7/18* (2013.01); *F02C 7/185* (2013.01); *F02C 7/224* (2013.01); *F02K 3/06* (2013.01); *F28D 1/0408* (2013.01); *F05D 2220/323* (2013.01); *F05D 2240/35* (2013.01); *F05D 2260/213* (2013.01); *F05D 2260/22141* (2013.01); *Y02T 50/671* (2013.01); *Y02T 50/675* (2013.01)

(56) References Cited

U.S. PATENT DOCUMENTS

| | | | |
|---|---|---|---|
| 2,925,712 A * | 2/1960 | London | F02C 7/224 60/785 |
| 3,080,716 A * | 3/1963 | Cummings | F02C 7/14 60/736 |
| 4,137,705 A * | 2/1979 | Andersen | F02C 7/14 60/39.08 |
| 4,151,710 A * | 5/1979 | Griffin | F02C 7/14 184/6.11 |
| 4,190,398 A * | 2/1980 | Corsmeier | F01D 5/18 415/114 |
| 4,327,802 A * | 5/1982 | Beldam | F28D 1/0333 165/153 |
| 4,474,001 A * | 10/1984 | Griffin | F02C 7/16 60/204 |
| 4,601,202 A * | 7/1986 | Colman | F01D 17/02 361/703 |
| 4,620,588 A * | 11/1986 | Pfouts | F01M 5/002 165/100 |
| 4,759,401 A | 7/1988 | Pfouts et al. | |
| 4,773,212 A * | 9/1988 | Griffin | F02C 7/224 60/226.1 |
| 4,791,982 A * | 12/1988 | Meyerhofer | F28D 1/0408 165/148 |
| 5,121,598 A | 6/1992 | Butler | |
| 5,177,951 A | 1/1993 | Butler | |
| 5,186,242 A * | 2/1993 | Adachi | B60H 1/3202 165/110 |
| 5,241,814 A | 9/1993 | Butler | |
| 5,269,135 A * | 12/1993 | Vermejan | F02C 7/04 60/226.1 |
| 5,898,995 A * | 5/1999 | Ghodbane | B23P 15/26 29/890.03 |
| 6,415,595 B1 * | 7/2002 | Wilmot, Jr. | B64D 13/006 60/266 |
| 6,584,778 B1 * | 7/2003 | Griffiths | F28D 7/06 60/782 |
| 8,205,426 B2 * | 6/2012 | Schilling | F01D 25/14 244/134 R |
| 8,601,791 B2 * | 12/2013 | Bajusz | F28F 9/0075 60/226.1 |
| 8,721,271 B2 * | 5/2014 | Wang | F01D 25/12 415/177 |
| 8,967,958 B2 | 3/2015 | Bajusz et al. | |
| 9,051,943 B2 * | 6/2015 | Elder | F02K 3/115 |
| 9,080,511 B2 * | 7/2015 | Suciu | F02C 7/08 |
| 9,200,570 B2 * | 12/2015 | Alecu | F02K 3/115 |
| 9,260,191 B2 * | 2/2016 | Pollard | F28D 1/0246 |
| 9,273,632 B2 * | 3/2016 | Ueda | F28F 3/02 |
| 9,599,410 B2 * | 3/2017 | Antel, Jr. | B23P 15/26 |
| 9,863,320 B2 * | 1/2018 | Ghazlane | F01D 25/12 |
| 2002/0005268 A1 * | 1/2002 | Noda | B60H 1/00878 165/42 |
| 2005/0268612 A1 | 12/2005 | Rolt | |
| 2007/0215326 A1 * | 9/2007 | Schwarz | F01D 5/046 165/96 |
| 2008/0053060 A1 * | 3/2008 | Olver | F02C 7/14 60/226.1 |
| 2008/0095611 A1 * | 4/2008 | Storage | F01D 25/125 415/116 |
| 2009/0159246 A1 * | 6/2009 | Cornet | F01D 25/08 165/138 |
| 2009/0165995 A1 * | 7/2009 | Bajusz | F01D 25/02 165/51 |
| 2010/0107603 A1 * | 5/2010 | Smith | F02C 7/14 60/267 |
| 2010/0139288 A1 | 6/2010 | Rago | |
| 2010/0186943 A1 * | 7/2010 | Sun | F01D 25/18 165/299 |
| 2010/0212857 A1 * | 8/2010 | Bulin | F02C 7/14 165/41 |
| 2010/0236213 A1 * | 9/2010 | Schilling | F01D 25/14 60/39.08 |
| 2011/0135455 A1 * | 6/2011 | Wang | F01D 25/12 415/178 |
| 2011/0146051 A1 * | 6/2011 | Hand | F02K 1/822 29/525.01 |
| 2011/0146229 A1 * | 6/2011 | Bajusz | F28F 9/0075 60/226.1 |
| 2011/0146944 A1 * | 6/2011 | Hand | F02K 1/822 165/47 |
| 2012/0114468 A1 * | 5/2012 | Elder | F02K 3/115 415/178 |
| 2012/0168115 A1 * | 7/2012 | Raimarckers | F01D 25/02 165/41 |
| 2013/0011246 A1 * | 1/2013 | Todorovic | F02K 3/06 415/177 |
| 2013/0160461 A1 * | 6/2013 | Broughton | H01R 12/61 60/796 |
| 2014/0027102 A1 * | 1/2014 | Antel, Jr. | F02C 3/04 165/185 |
| 2014/0033731 A1 | 2/2014 | Rackwitz | |
| 2014/0044525 A1 * | 2/2014 | Storage | F28F 3/12 415/144 |
| 2014/0202158 A1 | 7/2014 | Storage et al. | |
| 2014/0318749 A1 * | 10/2014 | Katoh | B60H 1/00328 165/140 |
| 2015/0211801 A1 * | 7/2015 | Philippart | F02C 7/14 165/104.14 |
| 2015/0252727 A1 * | 9/2015 | Aoki | F02C 7/14 165/104.4 |
| 2016/0131035 A1 * | 5/2016 | Diaz | B64D 33/12 60/226.1 |
| 2017/0030651 A1 * | 2/2017 | Rock, Jr. | F28D 7/022 |
| 2017/0211478 A1 * | 7/2017 | Storage | F02C 7/14 |

FOREIGN PATENT DOCUMENTS

| | | |
|---|---|---|
| JP | 2010-522842 A | 7/2010 |
| JP | 2011-521152 A | 7/2011 |
| WO | 2015/042514 A1 | 3/2015 |

OTHER PUBLICATIONS

Machine Translation and Notification of Reasons for Refusal issued in connection with corresponding JP Application No. 2016-241766 dated Dec. 26, 2017.

Machine Translation and Second office action and search issued in connection with corresponding CN application No. 201611234061.X dated Nov. 28, 2018.

* cited by examiner

METHOD AND SYSTEM FOR A COMBINED AIR-OIL COOLER AND FUEL-OIL COOLER HEAT EXCHANGER

BACKGROUND

The field of the disclosure relates generally to gas turbine engines and, more particularly, to a method and system for cooling oil in a gas turbine engine and maintaining a separation of a flammable coolant and an oxidizing coolant.

At least some known gas turbine engines include one or more oil cooling systems that are configured to cool and lubricate components of gas turbine engines. Some gas turbine engines include an air-oil surface cooler and/or a fuel-oil heat exchanger. Air-oil heat exchangers attached to the inner radial surface of the nacelle, and use fan air to cool the oil flowing through the air-oil heat exchanger. Air-oil surface coolers include fins protruding into the bypass airflow passageway that exchange heat with the relatively cold fan air.

Fuel in aircraft engines is often heated to prevent water in the fuel from freezing and to improve combustion of the fuel. In some gas turbine engines relatively hot oil is used to heat the fuel. Air has typically not been used to heat the fuel. A leak in the fuel-oil heat exchanger could put fuel and oxygen in contact with each other inside the engine. Having separate air-oil and fuel-oil heat exchangers takes up valuable space in the engine and adds weight to the engine.

BRIEF DESCRIPTION

In one aspect, a heat exchanger assembly includes a first internal flow path configured to channel a flow of fluid to be cooled from a first inlet to a first outlet. The heat exchanger assembly also includes a second internal flow path configured to channel a flow of a first coolant from a first inlet to a first outlet. The heat exchanger assembly further includes an external flow path configured to receive a flow of a second coolant proximate a surface of the external flow path.

In another aspect, a method of cooling a working fluid includes channeling one or more flows of a fluid to be cooled through a first internal flow path of a heat exchanger assembly. The method also includes channeling one or more flows of cooling fluid to a second internal flow path of the heat exchanger assembly. The method further includes channeling a flow of air proximate an exterior flow path of the heat exchanger. The heat exchanger includes a plurality of fin members extending proximate the flow stream. The first internal flow path is thermally coupled to the second internal flow path and the plurality of fin members.

In yet another aspect, a gas turbine engine includes a fan assembly including a bypass duct. The gas turbine engine also includes a core engine including a heat exchanger assembly. The heat exchanger assembly also includes a first internal flow path configured to channel a flow of fluid to be cooled from a first inlet to a first outlet. The gas turbine engine further includes a second internal flow path coupled in thermal communication with the first internal flow path and configured to channel a flow of a second coolant from a second inlet to a first outlet. The heat exchanger assembly also includes an external flow path configured to receive a flow of air proximate a surface of the external flow path.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a schematic view of a gas turbine engine.

FIG. 2 is a schematic diagram of a combined air-oil and fuel-oil heat exchanger.

FIG. 3 is a schematic axial view of the combined air-oil and fuel-oil heat exchanger shown in FIG. 2.

FIG. 4 is a schematic radial view of the combined air-oil and fuel-oil heat exchanger shown in FIG. 2 configured in a countercurrent flow arrangement.

FIG. 5 is a schematic radial view of the combined air-oil and fuel-oil heat exchanger shown in FIG. 2 configured in a concurrent flow arrangement.

Figure 1:
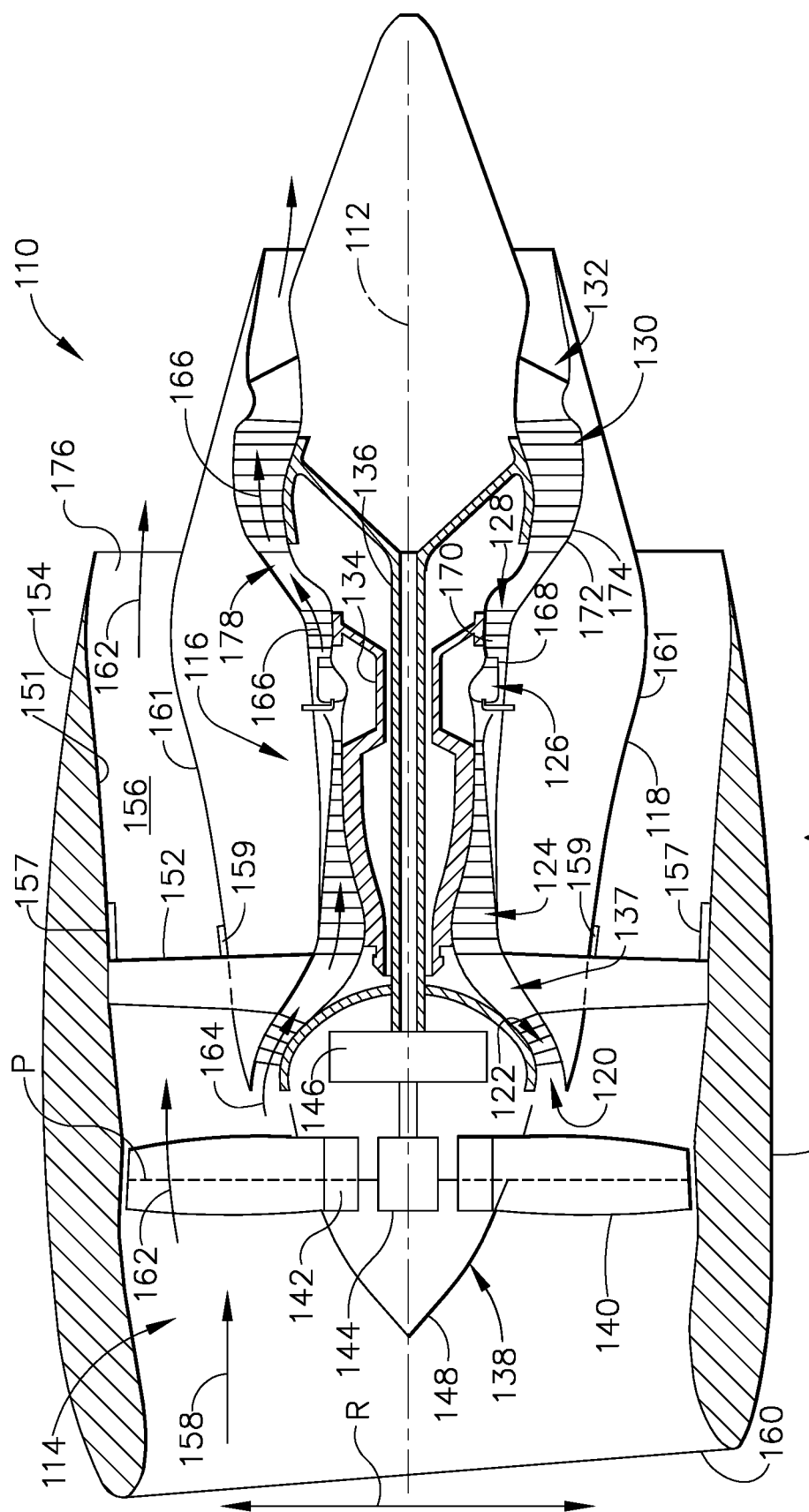
FIGS. 1-5 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a method and system for cooling oil in an aircraft engine.

Embodiments of the heat exchanger assembly described herein cool oil in a gas turbine engine. The heat exchanger assembly includes a combined air-oil and fuel-oil heat exchanger located on an inner radial surface of a nacelle. The combined air-oil and fuel-oil heat exchanger includes a first flow path for channeling fuel through the heat exchanger, a second flow path for channeling oil through the heat exchanger, and a third flow path for directing air proximate an outer finned surface of the heat exchanger. The heat exchanger cools the oil by exchanging heat with fan air in the fan bypass duct and by exchanging heat with fuel. In an exemplary embodiment, the heat exchanger is configured to cool oil with fan air in the fan bypass duct and fuel simultaneously. The heat exchanger includes a plurality of fins disposed on the surface of the heat exchanger, which protrude into the fan bypass duct. The oil and fuel flow through one or more conduits included in the heat exchanger. The oil conduits are disposed within the heat exchangers between the surface of the heat exchanger and the fuel conduits to maintain a separation between the flow of fuel in the heat exchanger and the flow of air past the heat exchanger. In an exemplary embodiment, the oil conduits and fuel conduits are configured to flow in a countercurrent flow arrangement.

During operation, the heat exchangers receive relatively hot oil from the engine and relatively cool fuel from a fuel pump. Fan air in the fan bypass duct exchanges heat with the plurality of fins which exchange heat with the oil. The fuel simultaneously exchanges heat with the oil. The oil is cooled by the fan air and the fuel at the same time in the single heat exchanger. The heat exchanger returns the heated fuel and cooled oil to the engine. In an alternative embodiment, the oil conduits and fuel conduits are configured to flow in a co-flow arrangement. In another alternative embodiment, the heat exchangers are located on an outer radial surface of the engine.

The heat exchanger assemblies described herein offers advantages over known methods of cooling oil in a gas turbine engine. More specifically, some known heat exchanger systems use separate heat exchanger assemblies to cool oil with air and fuel. Heat exchanger system described herein combines the air and fuel cooling into a single heat exchanger assembly that facilitates reducing the weight of the heat exchange system and of the aircraft engine. Placing oil conduits between the fuel conduits and the fan bypass duct creates a buffer between the air and fuel.

FIG. 1 is a schematic cross-sectional view of a gas turbine engine in accordance with an exemplary embodiment of the present disclosure. In the example embodiment, the gas turbine engine is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, turbine section, and nozzle section 132 together define a core air flow path 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed.

Referring still to the exemplary embodiment of FIG. 1, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 includes an inner radial surface 151. It should be appreciated that nacelle 150 may be configured to be supported relative to core turbine engine 116 by a plurality of circumferentially-spaced outlet guide vanes 152. Moreover, a downstream section 154 of nacelle 150 may extend over an outer portion of core turbine engine 116 so as to define a bypass airflow passage 156 therebetween. A plurality of combined air-oil cooler and fuel-oil cooler heat exchangers 157 is disposed on inner radial surface 151 of nacelle 150 in bypass airflow passage 156. In an alternative embodiment, a plurality of combined air-oil cooler and fuel-oil cooler heat exchangers 159 is disposed on outer radial surface 161 of outer casing 118 in bypass airflow passage 156.

During operation of turbofan engine 110, a volume of air 158 enters turbofan 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flow path 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166. First portion of air 162 exchanges heat with combined air-oil cooler and fuel-oil cooler heat exchangers 157 disposed on inner radial surface 151 of nacelle 150 in bypass airflow passage 156. In an alternative embodiment, first portion of air 162 exchanges heat with combined air-oil cooler and fuel-oil cooler heat exchangers 159 disposed on outer radial surface 161 of outer casing 118 in bypass airflow passage 156.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan 110, also providing propulsive thrust. HP turbine 128, LP turbine 130, and jet exhaust nozzle section 132 at least partially define a hot gas path 178 for routing combustion gases 166 through core turbine engine 116.

It should be appreciated, however, that exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Figure 2:
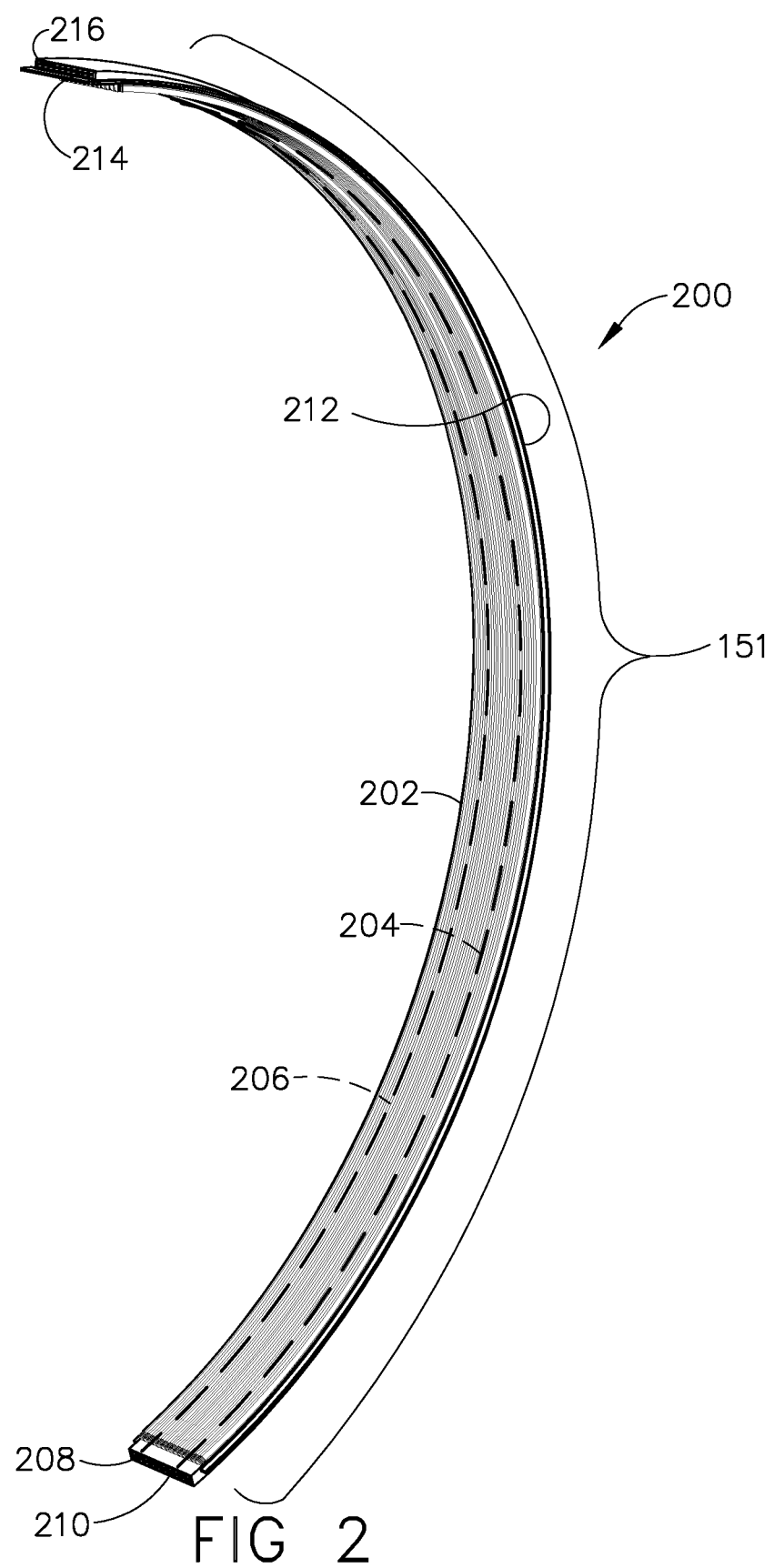

FIG. 2 is a schematic diagram of a heat exchanger assembly 200. In the example embodiment, the heat exchanger assembly 200 is a combined air-oil and fuel-oil heat exchanger. Heat exchanger assembly 200 includes a surface 202 disposed on inner radial surface 151 (shown in FIG. 1). Heat exchanger assembly 200 also includes a plurality of fin members 204 disposed on surface 202 and extending into bypass airflow passage 156 (shown in FIG. 1). A plurality of first internal flow paths 206 is disposed within heat exchanger assembly 200. Heat exchanger assembly 200 includes a plurality of first internal flow paths inlets 208 configured to receive oil and coupled in flow communication with first internal flow paths 206. Heat exchanger assembly 200 also includes a plurality of first internal flow paths outlets 210 coupled in flow communication with first internal flow paths 206. A plurality of second internal flow paths 212 is disposed within heat exchanger assembly 200. Heat exchanger assembly 200 includes a plurality of second internal flow path inlets 214 configured to receive fuel and that are coupled in flow communication with second internal flow paths 212. Heat exchanger assembly 200 also includes a plurality of second internal flow paths outlets 216 coupled in flow communication with second internal flow paths 212. First internal flow path 206 is disposed radially inward with respect to second internal flow path 212.

During operation, first portion of air 162 (shown in FIG. 1) in bypass airflow passage 156 (shown in FIG. 1) is configured to flow proximate to surface 202 and configured to exchange heat with fin members 204. First internal flow paths inlets 208 are configured to receive a flow of oil. First internal flow paths inlets 208 are configured to deliver the flow of oil to first internal flow paths 206. Oil in first internal flow paths 206 is configured to exchange heat with fuel in second internal flow paths 212 and with first portion of air 162 (shown in FIG. 1) in bypass airflow passage 156 (shown in FIG. 1). First internal flow paths 206 are configured to deliver oil to first internal flow paths outlets 210 which are configured to deliver oil to core turbine engine 116 (shown in FIG. 1).

Second internal flow paths inlets 214 are configured to receive a flow of fuel. Second internal flow path inlets 214 are configured to channel the flow of fuel to first internal flow paths 212. Fuel in second internal flow paths 212 is configured to exchange heat with oil in first internal flow path 206. Second internal flow paths 212 are configured to deliver fuel to second internal flow paths outlets 216 which are configured to channel fuel to core turbine engine 116 (shown in FIG. 1).

Figure 3:
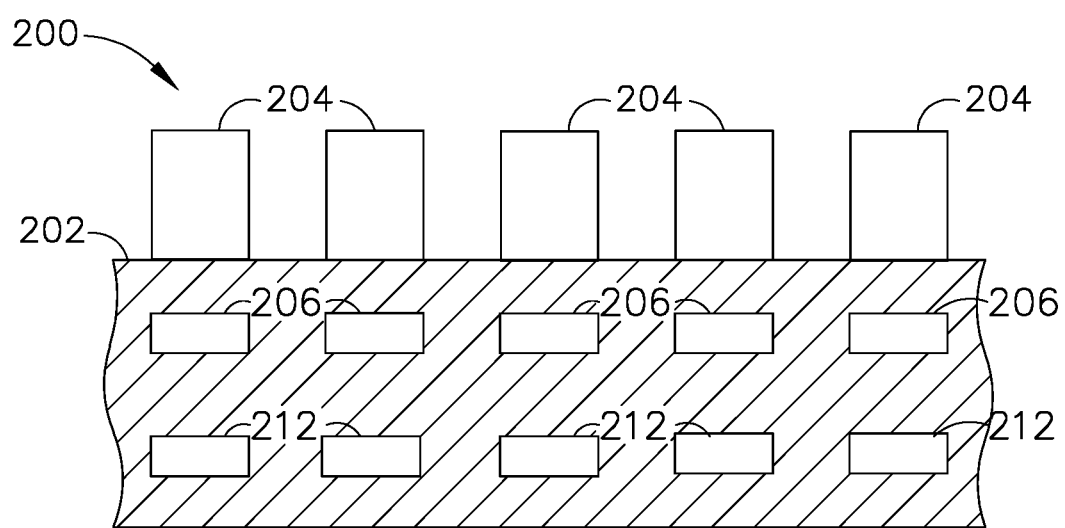

FIG. 3 is a schematic axial view of combined air-oil and fuel-oil heat exchanger assembly 200 shown in FIG. 2. First internal flow path 206 is disposed within heat exchanger assembly 200 between surface 202 and second internal flow path 212. In the event that fuel leaks from second internal flow path 212 toward surface 202, first internal flow path 206 acts as a buffer to intercept leaking fuel before it reaches bypass airflow passage 156 (shown in FIG. 1).

Figure 4:
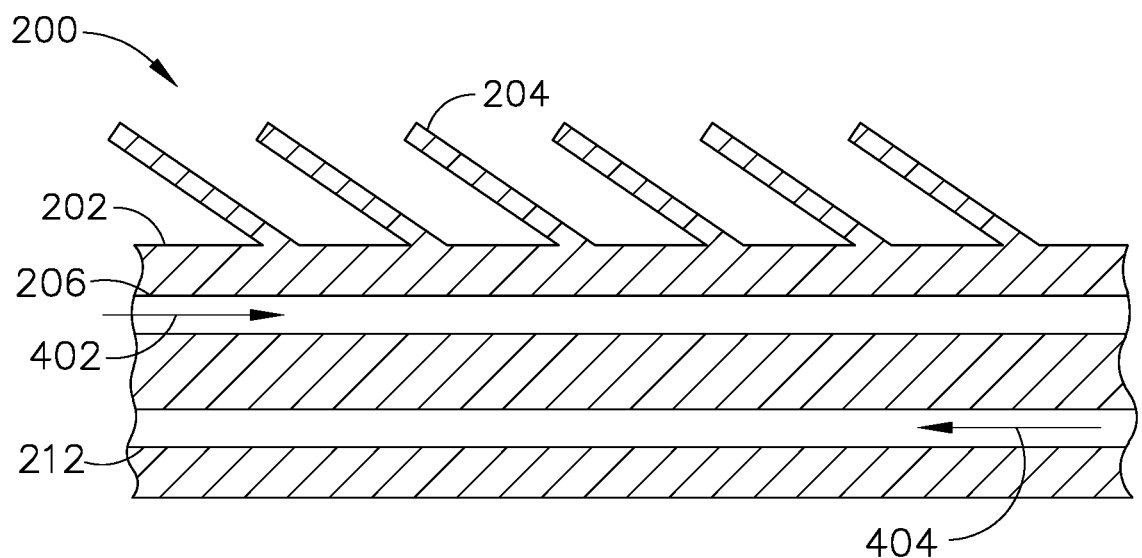

FIG. 4 is a schematic radial view of combined air-oil and fuel-oil heat exchanger assembly 200 shown in FIG. 2 configured in a countercurrent flow arrangement. First internal flow path 206 is configured flow oil in a first direction as indicated by arrow 402. Second internal flow path 212 is configured to flow fuel in a second direction as indicated by arrow 404. First direction 402 is opposite second direction 404.

Figure 5:
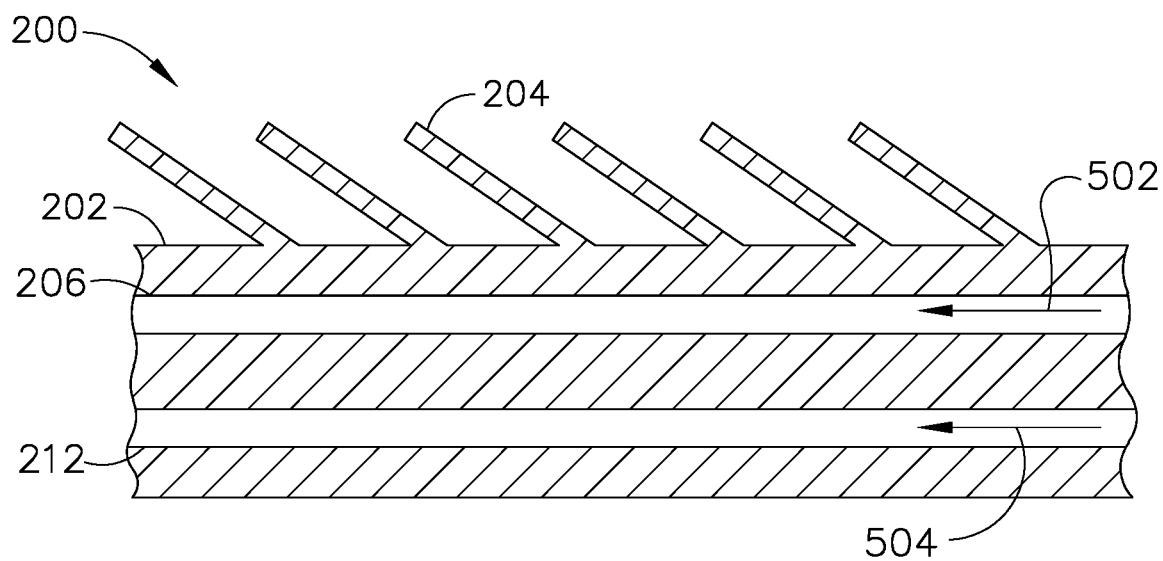

FIG. 5 is a schematic radial view of combined air-oil and fuel-oil heat exchanger assembly 200 shown in FIG. 2 configured in a co-current flow arrangement. First internal flow path 206 is configured to channel oil in a first direction as indicated by arrow 502. Second internal flow path 212 is configured to channel fuel in a second direction as indicated by arrow 504. First direction 502 is in substantially the same direction as second direction 504.

In an alternative embodiment, combined air-oil and fuel-oil heat exchanger assembly 200 is disposed on outer radial surface 161 of outer casing 118 in bypass airflow passage 156.

The above-described heat exchange assemblies provide an efficient method for cooling oil in a gas turbine engine. Specifically, the above-described heat exchange system combines an air-oil cooler and a fuel-oil cooler into a single heat exchanger. Combining the air-oil cooler and fuel-oil cooler into a single heat exchanger reduces the number of parts in an aircraft engine and reduces the complexity of the engine. As such, combining the air-oil cooler and fuel-oil cooler into a single heat exchanger reduces the weight of the engine. Additionally, locating the oil conduits between the fuel conduits and the bypass airflow passage creates a barrier between the fuel and the air. Creating a barrier between the air and the fuel reduces the likelihood that either will leak to the other.

Exemplary embodiments of combined air-oil cooler and fuel-oil cooler surface cooler are described above in detail. The combined air-oil cooler and fuel-oil cooler surface cooler, and methods of operating such systems and devices are not limited to the specific embodiments described herein, but rather, components of systems and/or steps of the methods may be utilized independently and separately from other components and/or steps described herein. For example, the methods may also be used in combination with other systems requiring oil cooling, and are not limited to practice with only the systems and methods as described herein. Rather, the exemplary embodiment can be implemented and utilized in connection with many other machinery applications that are currently configured to receive and accept combined air-oil cooler and fuel-oil cooler surface cooler.

Example methods and apparatus for cooling oil with air and fuel are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat exchanger assembly for a gas turbine engine comprising:
   an annular unitary body having:
      a first internal flow path configured to channel a flow of oil to be cooled from a first inlet to a first outlet, the first internal flow path being enclosed within and formed integrally with the unitary body;
      a second internal flow path in thermal communication with the first internal flow path and configured to channel a flow of a first coolant from a second inlet to a second outlet, wherein the first coolant comprises fuel, and wherein the second internal flow path is not in fluid communication with the first internal flow path, and the second internal flow path is enclosed within and formed integrally with the unitary body; and
      an external flow path configured to receive a flow of a second coolant proximate a circumferentially extending surface of the unitary body, the external flow path including a plurality of metallic fins wherein the first internal flow path is positioned radially between the second internal flow path and the external flow path.

2. The system of claim 1, wherein the first internal flow path and the second internal flow path are countercurrent flow.

3. The system of claim 1, wherein the first internal flow path provides a buffer between the second internal flow path and the external flow path.

4. The system of claim 1, wherein the second coolant comprises air.

5. A method of cooling a fluid using a three path heat exchanger assembly for a gas turbine engine, the heat exchanger assembly comprising an annular unitary body with a first internal flow path enclosed within and formed integrally with the unitary body, a second internal flow path enclosed within and formed integrally with the unitary body, and an exterior flow path, wherein the first internal flow path is not in fluid communication with the second internal flow path and the first internal flow path is positioned radially between the second internal flow path and the external flow path, the method comprising:
   channeling one or more flows of a fluid to be cooled through the first internal flow path of the heat exchanger assembly, wherein channeling one or more flows of fluid to be cooled through the first internal flow path of the heat exchanger assembly comprises channeling one or more flow of oil to the first internal flow path of the heat exchanger assembly;
   channeling one or more flows of cooling fluid through the second internal flow path of the heat exchanger assembly, wherein channeling one or more flows of cooling fluid through the second internal flow path of the heat exchanger assembly comprises channeling one or more flows of fuel to the second internal flow path of the heat exchanger assembly; and
   channeling a flow of air proximate the exterior flow path of the heat exchanger assembly, the heat exchanger assembly including a plurality of fin members extending proximate the exterior flow path, wherein the first internal flow path is thermally coupled to the second internal flow path and the plurality of fin members.

6. The method of claim 5, wherein channeling the flow of air proximate the exterior flow path of the heat exchanger assembly comprises channeling a flow of fan exhaust air proximate the plurality of fin members.

7. A gas turbine engine comprising:
   a fan assembly comprising a bypass duct; and
   a core engine comprising a heat exchanger assembly that includes:
      an annular unitary body having:
         a first internal flow path configured to channel a flow of oil to be cooled from a first inlet to a first outlet, the first internal flow path being enclosed within and formed integrally with the unitary body;
         a second internal flow path coupled in thermal communication with the first internal flow path and configured to channel a flow of a first coolant from a second inlet to a second outlet, wherein the first coolant comprises fuel, and wherein the second internal flow path is not in fluid communication with the first internal flow path, and the second internal flow path is enclosed within and formed integrally with the unitary body; and
         an external flow path configured to receive a flow of air proximate a circumferentially extending surface of the unitary body, the external flow path including a plurality of metallic fins in thermal communication with the first internal flow path wherein the first internal flow path is positioned between the second internal flow path and the external flow path.

8. The gas turbine engine of claim 7, wherein the first internal flow path and the second internal flow path are countercurrent flow.

9. The gas turbine engine of claim 7, wherein the first internal flow path provides a buffer between the second internal flow path and the external flow path.

10. The gas turbine engine of claim 7, wherein the heat exchanger assembly is disposed on a radially outer surface of the core engine.

11. The gas turbine engine of claim 7, further comprising a stationary annular casing at least partially surrounding the core engine, wherein the heat exchanger assembly is disposed on a radially inner surface of the annular casing.

* * * * *